(12) United States Patent
Bieber

(10) Patent No.: US 6,501,996 B1
(45) Date of Patent: Dec. 31, 2002

(54) PROCESS AUTOMATION SYSTEM

(75) Inventor: Jürgen Bieber, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/214,690

(22) PCT Filed: Jul. 3, 1997

(86) PCT No.: PCT/DE97/01407

§ 371 (c)(1),
(2), (4) Date: Jun. 14, 1999

(87) PCT Pub. No.: WO98/01797

PCT Pub. Date: Jan. 15, 1998

(30) Foreign Application Priority Data

Jul. 8, 1996 (DE) .......................... 196 27 464

(51) Int. Cl.⁷ .............................. G05B 11/01
(52) U.S. Cl. ............... 700/19; 700/9; 700/20;
700/2; 700/81; 700/82; 700/96; 709/216;
709/250; 340/825.49; 340/853.01; 340/855.2;
359/144; 359/167; 359/172; 359/180
(58) Field of Search ................. 700/9–20, 95, 700/2–3, 46, 50, 81, 82, 28–32; 709/216, 250; 340/825.49, 853.2, 310.01, 855.2, 855.3, 855.4, 855.5, 572.8; 359/144, 167, 172, 180, 110

(56) References Cited

U.S. PATENT DOCUMENTS

| 4,152,760 A | | 5/1979 | Freitas et al. .................. 700/9 |
| 4,542,479 A | | 9/1985 | Kamimura et al. ............ 700/79 |
| 4,581,701 A | | 4/1986 | Hess et al. .................... 700/82 |
| 5,168,441 A | * | 12/1992 | Onarheim et al. ............ 700/31 |
| 5,231,585 A | | 7/1993 | Kobayashi et al. ........... 700/96 |
| 5,732,338 A | * | 3/1998 | Schwob .................... 455/158.5 |
| 5,809,282 A | * | 9/1998 | Cooper et al. ................ 700/28 |
| 5,815,403 A | * | 9/1998 | Jones et al. .................... 700/2 |
| 5,870,313 A | * | 2/1999 | Boyle et al. .................. 700/28 |
| 5,949,678 A | * | 9/1999 | Wold et al. ................... 700/31 |
| 6,160,484 A | * | 12/2000 | Spahl et al. .................. 700/17 |

FOREIGN PATENT DOCUMENTS

| DE | 32 14 328 | 12/1982 |
| DE | 42 04 383 | 8/1993 |
| DE | 296 02 226 | 5/1996 |
| EP | 0 093 881 | 11/1983 |
| EP | 0 111 871 | 6/1984 |
| EP | 0 369 188 | 5/1990 |
| EP | 0 471 882 | 2/1992 |
| GB | 2 283 588 | 5/1995 |
| JP | 07 098 604 | 4/1995 |
| WO | WO 90/02982 | 3/1990 |

OTHER PUBLICATIONS

Nobuyuki Yokokawa et al., "Distributed Digital Control System: The Ex–5000 Series" Hitachi Review, vol. 42, No. 2, Apr. 1, 1993, pp. 87–94.

W. Adam et al., "Fernbetreuung Von CNC–Gesteuerten Fertigungsanlagen", ZWF Zeitschrift Fuer Wirtschaftlichen Fabrikbetrieb, vol. 91, No. 3, Mar. 1, 1996, pp. 84–87, XP000559640. Listed in Search Report.

(List continued on next page.)

Primary Examiner—Ramesh Patel
(74) Attorney, Agent, or Firm—Harness Dickey & Pierce, PLC

(57) ABSTRACT

A process automation system includes terminals for operating and monitoring purposes, automation devices for executing control functions, and a host computer. Communication between the terminals and the automation devices is exclusively established via the host computer. The host computer may be installed remotely, in a computing center.

17 Claims, 2 Drawing Sheets

OTHER PUBLICATIONS

Rolf Isermann, Bedeutung der Mikroelektronik für die Prozessautomatisierung, Etz, Bd. 106, 1985, H. 7/8, S. 330–337. English Abstract provided.

K.H. Reitz, Stand und Tendenzen bei der Prozessautomatisierung, E und M, S. 186–193. English abstract provided.

Peter Schmidt, Bodo Seifert, Redundanter Inter–Bus–S als integraler Bestandteil eines Prozessleitsystems, Atp–Automatisierungstechnische Praxis 38, 1996, 6, S. 41–47. Listed in Search Report.

Jens Thielmann, Dezenral bringt mehr, Drive & Control 1/96, S. 4–6. English abstract provided.

Carsten Schilling, Messen per Netzwerk, Elektronik 25/1994, S. 58–64. English abstract provided.

* cited by examiner

PROCESS AUTOMATION SYSTEM

BACKGROUND INFORMATION

In process automation systems, operating and monitoring equipment performs the operation and monitoring of processes in control technology, as well as archiving and documenting the process values generated and process messages from subordinate automation systems. In order for a process to be monitored and optionally operated simultaneously by multiple operators, client-server concepts are used today, where the server, also known as the host station or host computer, performs all the computing, and the clients, also known as terminals, are responsible only for graphic output and permit operator input and change of displays by using a mouse and keyboard. At the host station there is a process bus which establishes the connection with the automation equipment and a terminal bus which establishes the physical connection with the terminals. The host station and terminals are usually located in the control room or adjacent rooms.

Increasingly complex processes and automation systems make the highest demands on the host station with regard to computing power and memory capacity. Security requirements and regulations governing complete documentation of the production of a batch, for example, often require installation of another redundant system. This plus the care and maintenance of the equipment mean increased financial expenditures for plant operators.

SUMMARY OF AN INVENTION

The object of the present invention is to reduce the hardware.

One advantage of the automation system according to the present invention is that the required computing power can be supplied by a host computer outside the control room of the automated plant, in particular in a central computer center, so the plant operator need not have his own host computer (host station), thus eliminating the acquisition costs, care and maintenance for the plant operator. In particular, the possibility of simultaneous operation of multiple automation systems by the host computer makes it possible to design the latter as a supercomputer with an especially large computing power and memory, thereby increasing the benefit for each individual automation system. Almost all relevant data can be stored in the main computer, and all important process information can be archived to an almost unlimited extent and made available to the plant operator. Another advantage is the possibility of a redundant design of the automation system, which can be implemented, with regard to the host computer, invisibly to the plant manufacturer in the computer center.

Figure 1:
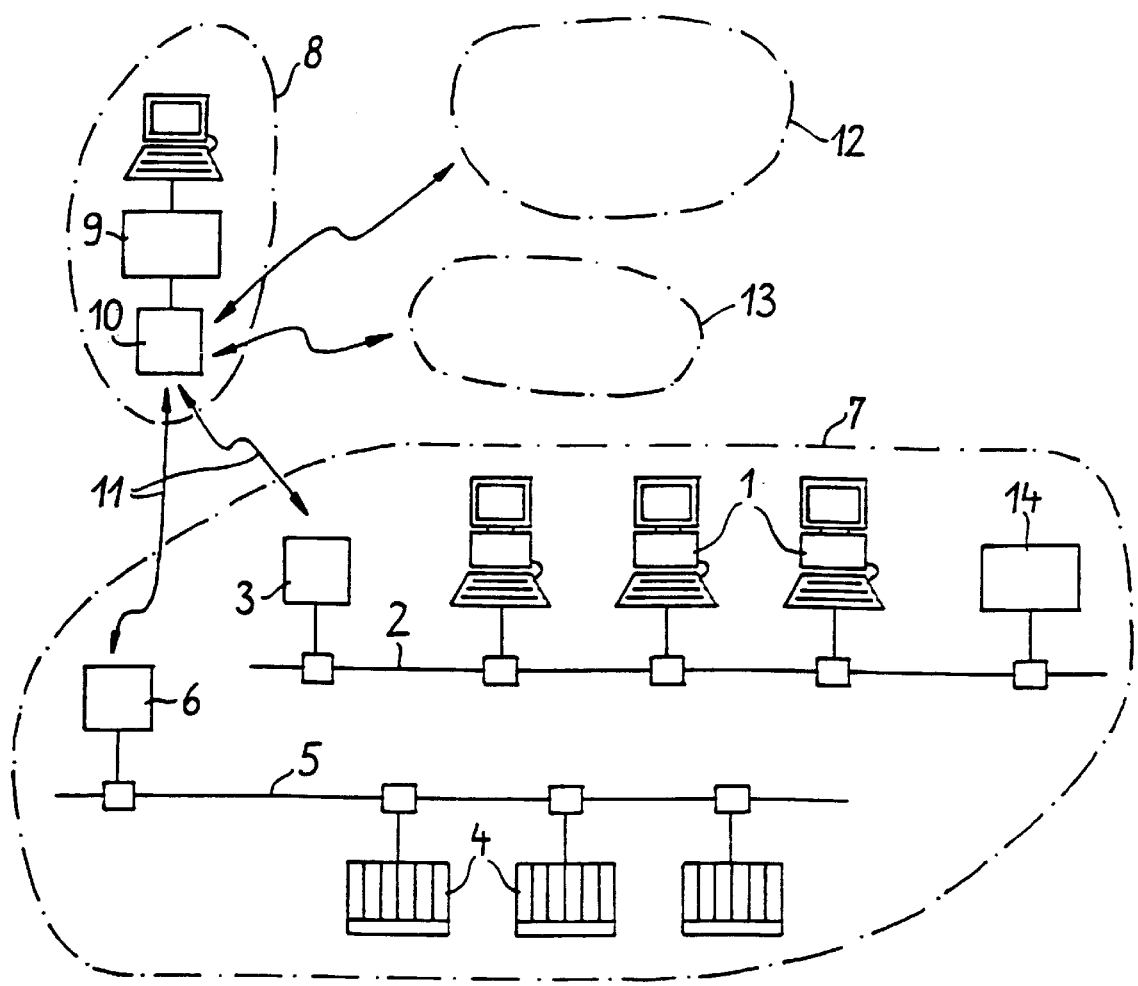
FIG. 1, shows a block diagram of a process automation system according to an exemplary embodiment of the present invention.

In the process automation system illustrated in FIG. 1, terminals 1 are connected to one another and to a transceiver device 3 over a terminal bus 2 on an operating and monitoring level. On a local operator automation level, automation devices 4, such as programmable controllers, are also connected to another transceiver device 6 via a process bus 5. While components 1 through 6 are parts of a plant 7, which is merely indicated here, where an industrial process controlled by the process automation system is taking place, a host computer 9 designed as a supercomputer is arranged outside plant 7, e.g., in a computer center 8, and communicates with transceiver devices 3 and 6 of plant 7 over a third transceiver device 10 and a data transfer medium 11 for long-distance data transmission, e.g., via a wireless link, a satellite link or a telecommunications network. Host computer 9 can communicate with other transceiver devices (not shown here) in other plants 12, 13 via transceiver device 10 and data transfer medium 11. In deviation from the embodiment illustrated here, a separate transceiver device may also be assigned to each individual terminal 1 or to terminal groups. The same thing also applies to automation equipment 4. In addition, transceiver devices 3, 6, 10 and host computer 9 may also be implemented in a redundant design. Thus, for example, transceiver device 10 may have a switching device to make it possible to switch to another redundant host computer in case of need.

In contrast with traditional automation systems, process bus 5 of subordinate automation systems 4 is not linked to terminals 1 of the operating and monitoring level; instead, the data from the local automation level is relayed to host computer 9 over data transfer medium 11.

The process automation system can be configured over terminals 1 and a configuration computer 14 in the operating and monitoring level. Then the configured plant displays are run in host computer 9. Then terminals 1 are used only for graphic output of plant displays and for operator control. Any change in plant data, i.e., a change in configuration, is transmitted from the operating and monitoring level to host computer 9, which accepts the change and transmits the new configuration form to all terminals 1.

With an identification number or the password of host computer 9, any terminal in the world can be connected to host computer 9 and can observe the process and even operate it if it has suitable access authorization.

Figure 2:
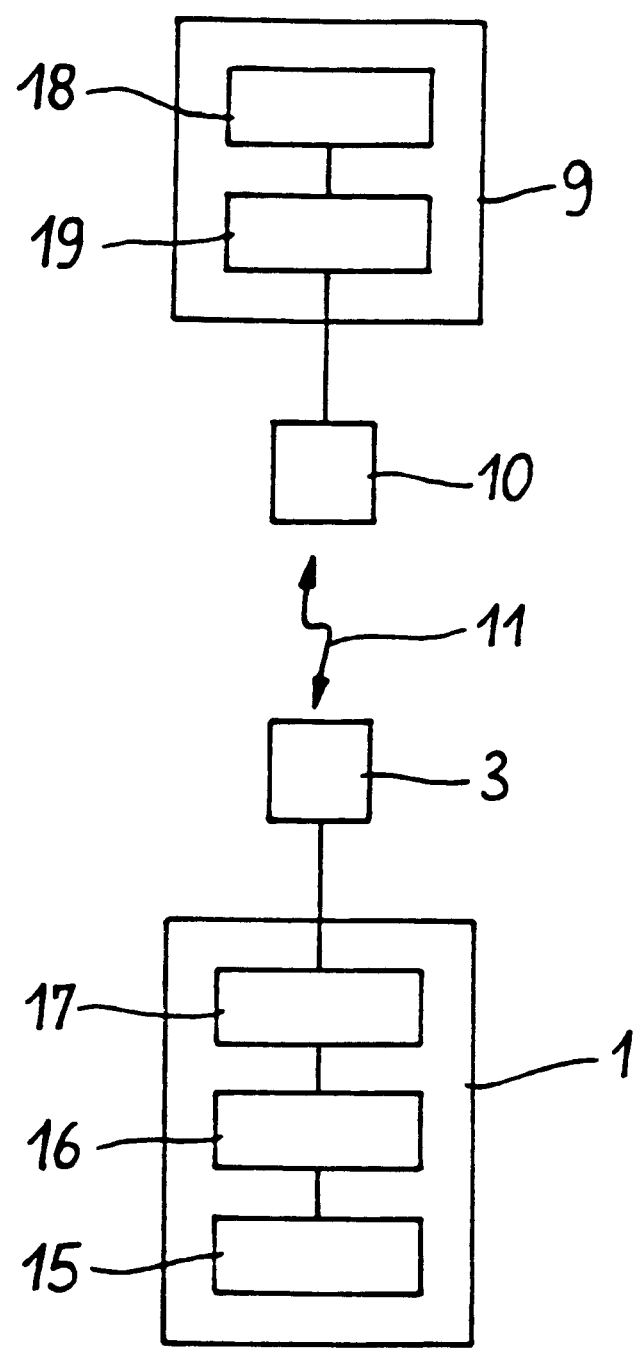
FIG. 2, shows an example of the data transfer structure in the process automation system.

FIG. 2 shows host computer 9, which communicates with terminal 1 over transceiver device 10, data transfer medium 11 and transceiver device 3. In terminal 1, its standard software 15 is expanded by communication software 16 which assumes the function of data transfer to and from terminal 1. Communication software 16 is running as an independent task and addresses a communication driver 17 which forms the interface with transceiver device 3. Host computer 9 contains a modem-wireless driver 19 in addition to its standard software 18.

What is claimed is:

1. A process automation system, comprising:
    first terminals on a first operating and monitoring level monitoring a process and coupled to a first transceiver device;
    first local operator automation devices on a first subordinate automation level coupled to a second transceiver device via a process bus; and
    a host computer coupled to a third transceiver device, the third transceiver device communicating with the first transceiver device and the second transceiver device over a data transfer medium, data being exchanged between the first operating and monitoring level and the first subordinate automation level via the host computer, whereby the process bus is not linked to said first terminals.

2. The process automation system according to claim 1, wherein the data transfer medium includes a wireless link.

3. The process automation system according to claim 1, wherein the data transfer medium includes a telecommunications network.

4. The process automation system according to claim 1, wherein the first terminals are coupled to one another and to the first transceiver device over a terminal bus.

5. The process automation system of claim 4, wherein the first local operator automation devices are coupled to one another and to the second transceiver device over a process bus.

6. The process automation system of claim 5, wherein the terminal bus and process bus are not directly linked together.

7. The process automation system of claim 5, wherein the terminal bus and process bus are linked only through the host computer.

8. The process automation system according to claim 1, wherein the first local operator automation devices are coupled to one another and to the second transceiver device over a process bus.

9. The process automation system according to claim 1, wherein the host computer manages at least one additional process and is part of at least one additional process automation system, the at least one additional process automation system including second terminals on a second operating and monitoring level, the second terminals coupled to a fourth transceiver, the at. least. one additional process automation system further including second local operator automation devices on a second subordinate automation level, the second local operator automation devices coupled to a fifth transceiver device, the third transceiver device communicating with the fourth transceiver device and the fifth transceiver device over the data transfer medium.

10. The process automation system of claim 9, wherein the host computer recognizes at least one of the first terminals and first local operator automation devices and the second terminals and second local operator automation devices based upon at least one of an identification number and password.

11. The process automation system according to claim 1, wherein the first transceiver device, the second transceiver device, and the third transceiver device are designed with at least partial redundancy.

12. The process automation system according to claim 1, wherein the host computer has a redundant design.

13. The process automation system of claim 1, wherein the system is for a plant.

14. The process automation system of claim 13, wherein the host computer is located remote from the plant and the first and second terminals are located within the plant.

15. The process automation system of claim 1, wherein the data transfer medium includes a satellite link.

16. The process automation system of claim 1, wherein at least one of the first, second, and third receivers includes a modem.

17. The process automation system of claim 1, wherein the host computer is a supercomputer.

* * * * *